2,810,705

PROCESS FOR PREPARING SOLID ELASTIC ORGANOPOLYSILOXANES

Frederick M. Lewis, Ballston Lake, N. Y., assignor to General Electric Company, a corporation of New York No Drawing. Application December 3, 1953, Serial No. 396,066

4 Claims. (Cl. 260—37)

This invention is concerned with organopolysiloxanes convertible to the cured, solid, elastic state which have improved compression set characteristics at elevated temperatures. More particularly, the invention is concerned with a composition of matter comprising (1) an organopolysiloxane convertible to the cured, solid, elastic state from which lower molecular weight volatile organopolysiloxanes of similar structure boiling below 250° C. contained in the aforesaid convertible organopolysiloxane have been removed to a point where at most 2 percent or less of the remaining convertible organopolysiloxane are the aforesaid low boiling materials and (2) a low compression set additive.

Silicone rubber cured to the substantially infusible and insoluble state has found wide use in many applications where continued exposure to elevated temperatures without undue deterioration is a requirement. It has been found that although silicone rubber can resist high temperatures for long periods, neverthelsss when the silicone rubber is maintained in the compressed state at these elevated temperatures, it becomes permanently deformed to varying extents when the pressure is released. Although the recovery is substantial, in many applications, particularly in gasketing applications, it is highly desirable that permanent deformation be reduced to a minimum in order to obtain the best sealing effects.

Various compression set additives have been incorporated in convertible organopolysiloxanes (usually with fillers and curing agents) in order to reduce this permanent deformation. Thus, U. S. Patent 2,448,530-Jones issued September 7, 1948, and assigned to the same assignee as the present invention discloses the use of mercury, oxides of mercury, and salts of mercury as additives for incorporation in the silicone rubber prior to vulcanization thereof for the purpose of improving the compression set of the cured or vulcanized silicone rubber. Additional compression set additives have been discovered in the past, among these being, for instance, various cadmium salts of organic acids, quinones, naphthoquinones, alkylated quinones, halogenated quinones, alkylated naphthoquinones, halogenated naphthoquinones, and hydrocarbon monoethers of hydroquinone, many examples of which are found described in the application of Charles W. Pfeifer, Serial No. 280,369, now U. S. 2,666,041, issued January 12, 1954; and isopropylbenzene hydroperoxide and p-tertiary butylisopropylbenzene hydroperoxide, disclosed and claimed in the application of Charles W. Pfeifer, Serial No. 280,368, now U. S. Patent 2,704,748, both of the foregoing Pfeifer applications being filed April 3, 1952, and assigned to the same assignee as the present invention. By reference, the aforementioned Jones patent and two Pfeifer applications are made part of the disclosures of the instant application with regard to the use of the various compression set additives described in these patent applications and patent.

Although the above-described compression set additives do reduce to a great extent the degree of deformation under compression encountered at elevated temperatures, nevertheless there is a great deal to be desired in this direction. Unexpectedly I have discovered that greater improvements and reductions in compression set can be attained by the use of these compression set additives if one employs as the convertible organopolysiloxane a convertible composition which contains at most 2 percent, by weight, of the latter of the low molecular weight volatile organopolysiloxanes boiling below 250° C. and ordinarily present in the convertible organopolysiloxane.

The manner whereby the presence of these volatile organopolysiloxanes occurs may be illustrated by reference to the preparation of convertible methylpolysiloxane. Thus, in the preparation of methylpolysiloxanes which are convertible to the cured, solid, elastic state, one usually polymerizes a low molecular weight methylpolysiloxane such as octamethylcyclotetrasiloxane by means of alkaline agents, such as potassium hydroxide, to a material of high molecular weight having viscosities ranging from about 500,000 to approximately 20,000,000 centipoises, which materials are extremely viscous or are gummy solids. These high molecular weight convertible polydimethylsiloxanes have been found to contain from 10 to 15 percent, by weight, thereof, of low molecular weight methylpolysiloxanes of similar structure as the high molecular weight product (that is, having a plurality of dimethylsiloxy units) and boiling below 250° C. at 760 mm., which low molecular weight products comprise cyclic polydimethylsiloxanes, for example, octamethylcyclotetrasiloxane, decamethylcyclopentasiloxane, dodecamethylcyclohexasiloxane, etc.

Convertible organopolysiloxanes containing at most 2 percent low molecular weight volatile organopolysiloxanes boiling below 250° C. at atmospheric (760 mm.) pressure are more particularly described and claimed in the copending application of Ben A. Bluestein, Serial No. 396,069, now U. S. Patent 2,793,198, filed concurrently herewith and assigned to the same assignee as the present invention. Removal of volatile materials of similar structure (i. e., having a plurality of the same recurring structural units) which generally comprise low molecular weight (below 500 molecular weight) cyclic diorganosiloxanes, for instance, those described above as well as cyclopolydiethylsiloxanes (e. g., hexaethylcyclotrisiloxane), the trimer of methyl ethylsiloxane, may be accomplished by various means. One method comprises heating the convertible organopolysiloxane at elevated temperatures of the order of from about 100° to 300° C., preferably under reduced pressure, where more moderate temperatures can be employed, for a time sufficient to remove the desired volatile materials. Another method for removing the volatile materials from the convertible organopolysiloxane comprises employing a selective solvent extraction process whereby liquids are employed in which the low molecular weight volatile products boiling below 250° C. at atmospheric pressure (760 mm.) are soluble, but in which the higher molecular weight heat-convertible organopolysiloxanes are substantially insoluble. Among such liquids may be mentioned, for instance, ethanol, butyl alcohol, isopropyl alcohol, various ketones, etc., and mixtures of these liquids. A still further method which may be employed involves polymerizing the hydrolyzed diorganodihydrolyzable silane used to make the convertible organopolysiloxane in solution whereby the low molecular weight products boiling below 250° C. are removed in the solvent used for polymerization, while the higher molecular weight products (which are to be employed in future processing for conversion to the cured, solid, elastic state) are insoluble and separate readily.

It has also been found that, in addition to removing the low boiling volatile materials (i. e., those having a boiling point below 250° C. at 760 mm.), one can also isolate, for instance, by suitable selective precipitation from solution the desired convertible organopolysiloxane, thereby eliminating therefrom other undesirable polymeric products ranging in molecular weight from about 1,000 to 100,000, which do not contribute appreciably to the advantageous properties of the cured organopolysiloxane. However, removal of the latter molecular weight products is not essential in my invention, and makes only slight difference in the ultimate outstanding low compression properties attainable as a result of the practice of my invention.

It is advantageous, when heating the convertible organopolysiloxane at the elevated temperatures required under reduced pressure to effect volatilization of the low boiling volatiles, first to neutralize any polymerization catalyst which may be present in the convertible organopolysiloxane in order to prevent undesirable depolymerization of the convertible organopolysiloxane. It will, of course, be apparent that the removal of the low boiling volatiles (this term will hereinafter be intended to include and consist essentially of volatiles boiling below 250° C. at atmospheric pressure of about 760 mm. and having an average molecular weight of below 500) may be carried out even when the convertible organopolysiloxane has previously been mixed with a filler, for instance, silica aerogel, etc. If the low boiling volatiles are removed from the convertible organopolysiloxane without filler contained therein, various fillers may then be incorporated as, for instance, finely divided silicas, e. g., diatomaceous earth, silica aerogel, etc., calcium carbonate, iron oxide, titanium dioxide, lithopone, etc. The amount of filler (mixtures of fillers may also be used) employed may be varied widely and may comprise, for instance, from about 25 to 300 percent of the weight of the convertible polysiloxane. The exact amount of filler employed will depend upon such factors as, for instance, the application for which the convertible organopolysiloxane is intended, type of convertible organopolysiloxane and filler employed, etc.

In the specification and claims, the convertible organopolysiloxanes, which may be highly viscous masses or gummy solids, depending upon the state of condensation, will hereafter be referred to as "convertible organopolysiloxanes" or, more specifically, as "convertible methylpolysiloxanes." These convertible organopolysiloxanes may be changed to the cured, solid, elastic state by heating in the presence of curing agents and by irradiation with high energy electrons as disclosed and claimed in the Lewis and Lawton application Serial No. 291,542, filed June 3, 1952, now U. S. Patent 2,763,609, and assigned to the same assignee as the present invention, etc.

Although convertible organopolysiloxanes with which the present invention is concerned are now well known in the art, for purposes of showing persons skilled in the art the various convertible organopolysiloxanes which may be employed in the practice of the present invention, attention is directed to the convertible organopolysiloxanes containing less than 0.2 mol percent (preferably these convertible organopolysiloxanes should be free of any copolymerized monoorganosiloxane) copolymerized monoorganosiloxane disclosed and claimed in Agens Patent 2,448,756 and Sprung et al. Patent 2,448,556, both issued September 7, 1948, in Sprung Patent 2,484,595 issued October 11, 1949, or in Krieble et al. Patent 2,457,688 issued September 28, 1948, all the foregoing patents being assigned to the same assignee as the present invention, as well as in Warrick Patent 2,460,795. It will, of course, be better understood by those skilled in the art that the heat-convertible organopolysiloxane may contain the same or different silicon-bonded organic substituents (e. g., methyl, ethyl, propyl, phenyl, tolyl, xylyl, benzyl, phenylethyl, naphthyl, chlorophenyl, both methyl and phenyl, both methyl and chlorophenyl, etc. radicals) connected to silicon atoms by carbon-silicon linkages.

The particular convertible organopolysiloxane used in the practice of this invention is not critical and is advantageously obtained by hydrolyzing a diorganodihydrolyzable silane, for instance, dimethyldichlorosilane, mixtures of dimethyldichlorosilane and diphenyldichlorosilane, mixtures of dimethyldichlorosilane and methyl phenyldichlorosilane, etc. (with or without the presence of small amounts of monoorganotrihydrolyzable silanes or triorganohydrolyzable silanes, e. g., methyltrichlorosilane, trimethylchlorosilane, etc.), thereafter effecting polymerization of the hydrolysis product using, for instance, an alkaline agent, such as potassium hydroxide, or an acidic agent, such as ferric chloride for the purpose. An additional method for preparing these convertible organopolysiloxanes comprises polymerizing mixtures of diorganosiloxanes in which the organic groups are different as, for instance, the mixtures of polydimethylsiloxanes and polydiphenylsiloxanes, more particularly, for instance, mixtures of octamethylcyclotetrasiloxane and hexaphenylcyclotrisiloxane, etc., employing the same alkaline agents or other suitable polymerizing or rearrangement agents for the desired purpose.

Generally, it is desirable that the convertible organopolysiloxane comprise the recurring structural unit $RR'SiO$, where $R$ and $R'$ are monovalent hydrocarbon radicals, many examples of which have been given above, for instance, alkyl, aryl, aralkyl, alkaryl, halogenated aryl, etc. radicals. It is also desirable that in the convertible organopolysiloxane the majority of the $R$ and $R'$ radicals be lower alkyl radicals, for instance, methyl radicals and such dialkylsiloxy units comprise at least 50 percent of the total number of organic groups bound to the silicon atoms by carbon-silicon linkages. It is usually preferred that the organopolysiloxane from which the curable organopolysiloxanes are prepared contain an average of from about 1.98 to about 2.1 organic groups, for instance, methyl groups, total methyl and phenyl groups, etc. per silicon atom, and more than 98 percent, for example, 99.8 percent of the silicon atoms of the polysiloxane contain two silicon-bonded organic groups, for instance, alkyl groups or mixtures of alkyl and aryl groups, etc., per silicon atom.

In order to accelerate the cure of the devolatilized convertible organopolysiloxane (either with or without fillers), it is desirable to add to the latter various curing agents (which should not be present during the devolatilization step), for example, benzoyl peroxide, tertiary butyl perbenzoate, etc. These curing agents (mixtures of which are not precluded) may be present in various amounts ranging from about 0.5 to as high as 8 percent, by weight, or more based on the weight of the convertible organopolysiloxane. The compression set additives employed in the practice of my invention may also be present in varying amounts. In general, the amount of additive which may be used will vary depending on such factors as the type of vulcanizable organopolysiloxane employed, the kind of filler used in making the silicone rubber, the specific additive employed, the application for which the vulcanized silicone rubber is intended, etc. Generally, I may employ on a weight basis, based on the weight of the convertible organopolysiloxane, from 0.25 to 10 percent, by weight, of the compression set additive, preferably from about 1 to 7 percent of the aforesaid additive.

The convertible organopolysiloxane substantially free of the volatile organopolysiloxanes may be compounded on ordinary rubber compounding differential rolls with the fillers (if not already present) and curing agents described above, and any other material usually incorporated in convertible organopolysiloxanes, together with the desired compression set additive, and thereafter molded for about 10 to 30 minutes or more at temperatures ranging from about 110° to 150° C., and then further heat-treated outside the mold, preferably in an air-circulating oven, for about 12 to 36 hours or more at temperatures ranging from about 200 to 250° C. It will be found that after these curing cycles, the percentage compression set of the molded product will be considerably reduced over the percentage compression set of control samples containing all these ingredients with the exception that instead of using a convertible organopolysiloxane substantially free of the volatile materials, a convertible organopolysiloxane is employed in which no attempt has been made to remove these low boiling volatile organopolysiloxanes which are essentially the low molecular homologues of the remaining convertible organopolysiloxane.

In order that those skilled in the art may better understand how the present invention may be practiced, the following examples are given by way of illustration and not by way of limitation. All parts are by weight.

*Example 1*

Substantially pure dimethyldichlorosilane was hydrolyzed with water to give a mixture of cyclic dimethylsiloxane. This reaction product was thereafter processed in order to remove and isolate substantially pure octamethylcyclotetrasiloxane boiling at 175° C. A convertible methylpolysiloxane was prepared from the octamethylcyclotetrasiloxane by mixing the latter with about 0.01 percent, by weight, thereof KOH, and heating the aforesaid mixture of ingredients at a temperature of about 150° C. for about 4 hours. At the end of this time, there was obtained a highly viscous, polymeric dimethylsiloxane having scarcely any flow at room temperature. The low boiling volatiles which were present in an amount equal to about 11 to 15 percent of the weight of the convertible methylpolysiloxane were removed as follows: 1,000 grams of the above-prepared convertible organopolysiloxane were dissolved in 6,000 cc. of toluene and treated as follows: To neutralize the KOH, an excess of a 1 percent HCl solution was added and thoroughly agitated with the above-identified toluene solution of the convertible organopolysiloxane. The HCl was removed and the polymer solution was intimately washed thoroughly with water four times. Methanol was added to the toluene solution of the polymer to effect precipitation of the high molecular weight polymer. The latter was separated and washed with a 70/30 toluene-methanol mixture followed by three methanol washes to give a convertible methylpolysiloxane containing about 0.7 percent, by weight, thereof of the volatile methylpolysiloxanes. Another method for obtaining a similar product from which most of the low-boiling volatiles have been removed is as follows: About 50 pounds of the convertible methylpolysiloxane described above (the neutralization being omitted) were charged to a Baker-Perkins dough mixer, and while being kneaded in this mixer were washed with 50-pound batches of water as follows: 3 cold water washes of 50 to 60 minutes were employed first, and thereafter two hot water washes of 50 to 60 minutes (90–100° C.) were employed in order to remove all water-soluble materials including any silanols and catalysts used for the polymerization process. The polymer was then stripped for 2.5–3 hours at 140–160° C. (polymer temperature) until the volatile content (when measured 135° C./2–5 mm. for 45 minutes) was 0.7 percent or less. A 30-minute air strip was used (at 130–150° C.) to complete the removal of water. This air stripping was conducted by passing heated air (at a temperature of about 130–150° C.) through the convertible methylpolysiloxane. This cycle can be shortened by using hot water washes and higher stripping temperatures. The stability of the polymer was ascertained by determining the weight loss at 250° C. for 24 hours; this test resulted in only a 4 to 6 percent weight loss. The amount of volatiles in excess of the maximum 2 percent called for in the above description is accounted for by the additional depolymerization caused by the continued heating of the polymer at 250° C.

*Example 2*

The devolatilized convertible methylpolysiloxane described in Example 1 above and obtained by washing and air-stripping was mixed with diatomaceous earth, benzoyl peroxide as a curing agent, and mercurous oxide (which is a specific additive for improving the compression set of silicone rubber as is more particularly described and claimed in the aforementioned Jones Patent 2,448,530). A formulation was also prepared in which the mercurous oxide was omitted from the mixture of the diatomaceous earth and devolatilized gum. As controls, additional formulations were prepared in which a non-devolatilized methylpolysiloxane convertible to the solid, elastic state, and more particularly described in Example 1 before removal of volatiles, was mixed with the benzoyl peroxide and with either the aforesaid diatomaceous earth alone or with the latter and the mercurous oxide. The following Table I shows the formulations which were prepared employing the usual mixing procedures for the purpose.

TABLE I

| Sample No. | Parts Devolatilized Gum | Parts Non-Devolatilized Gum | Parts Diatomaceous Earth | Parts Benzoyl Peroxide | Parts Mercurous Oxide |
|---|---|---|---|---|---|
| 1 | | 100 | 100 | 1.7 | |
| 2 | | 100 | 100 | 1.7 | 1.7 |
| 3 | 100 | | 100 | 1.7 | |
| 4 | 100 | | 100 | 1.7 | 1.7 |
| 5 | 100 | | 110 | 1.7 | 1.7 |

Each of the above formulations was molded into the form of sheets for about 15 minutes at about 120° C. under a pressure of about 500 p. s. i., removed from the mold, and thereafter oven-cured in an air-circulating oven for 24 hours at 250° C. At the end of this time, each of the molded samples was tested for compression-set properties in accordance with ASTM D–395–49T, method D heating the samples under compression for 70 hours at 150° C. The results of these tests are described below in Table II wherein each of the molded samples had a durometer (Shore A hardness) of approximately 65 to 70.

TABLE II

| Sample No. | Tensile, p. s. i. | Percent Elongation | Percent Compression Set |
|---|---|---|---|
| 1 | 685 | 70 | 79 |
| 2 | 600 | 90 | 26 |
| 3 | 660 | 100 | 84 |
| 4 | 605 | 120 | 14 |
| 5 | 660 | 110 | 12 |

*Example 3*

This example illustrates the effect of using another compression set additive, namely, 2,5-ditertiary butyl quinone. More particularly, the devolatilized convertible methyl polysiloxane employed in Example 2 above was mixed with diatomaceous earth as a filler and this sample divided into two portions; to one portion was added the above-mentioned quinone and benzoyl peroxide and to the other portion was added only the benzoyl peroxide. As a further control, the non-devolatilized methyl polysiloxane described in Example 1 was mixed with the same diatomaceous earth, 2,5-ditertiary butyl quinone, and benzoyl peroxide. The following Table III shows the ingredients employed and the proportions of the latter in each formulation.

TABLE III

| Sample No. | Parts Devolatilized Gum | Parts Filler | Parts Additive | Parts Benzoyl Peroxide |
|---|---|---|---|---|
| 6 | 100 | 100 | | 1.7 |
| 7 | 100 | 100 | 1.7 | 1.7 |
| 8 | ¹100 | 100 | 1.7 | 1.7 |

¹ Non-devolatilized convertible methyl polysiloxane.

Samples of each of the above three formulations were molded and heat-treated similarly as was carried out in connection with the molded samples described in Example 2 and thereafter each molded sample was tested for compression set properties in accordance with the aforementioned ASTM test method employing the same test conditions, with the exception that the compressed sample was heated for 22 hours at 177° C. instead of 70 hours at 150° C. (actually these conditions are quite comparable for giving equivalent results and the shorter heating period at higher temperatures permits determination of compression set properties in shorter periods of time). The results of these tests are described below in Table IV.

TABLE IV

| Sample No. | Tensile, p. s. i. | Percent Elongation | Percent Compression Set |
|---|---|---|---|
| 6 | 825 | 75 | 58 |
| 7 | 590 | 110 | 18 |
| 8 | 580 | 130 | 25 |

It will, of course, be understood by those skilled in the art that other convertible organopolysiloxanes, fillers, curing agents, curing means, compression set additives, etc. may be employed in place of those used in the foregoing examples without departing from the scope of the invention. Obviously the proportions of ingredients employed in the practice of the present invention may be varied widely and no intent is to be read into the present description that the limits of the ingredients described are the only ones intended.

As will be apparent to those skilled in the art, other methods for removing the low molecular weight volatiles from the organopolysiloxane boiling below 250° C. may be employed. In addition to the methods described in the above examples, one may intensively mix the convertible organopolysiloxane in a Baker-Perkins dough mixer, and simultaneously pass a gas, such as either air or steam, through the chamber containing the convertible organopolysiloxane so that the passage of the air or steam occurs through the convertible organopolysiloxane. Kneading action forces the gas bubbles into contact with the volatile organopolysiloxanes which are then diffused into the gas phase. Further kneading brings the bubbles of gas to the surface releasing the gas and gas-containing volatiles which can then be collected in a suitable apparatus. In this connection it is desirable that any condensing agent used to make the convertible organopolysiloxane be either neutralized or removed. The temperature of the stripping gas can be varied from about room temperature (if air is used) to 150–180° C. (if steam is used). The bubbles can be removed by simply heating and kneading the convertible organopolysiloxane under high vacuum. This method for removing the low boiling volatiles from the convertible organopolysiloxane is more particularly disclosed and claimed in the copending application of Robert L. Hatch and John F. Blumenfeld, Serial No. 396,068, filed concurrently herewith and assigned to the assignee of the present invention.

It will, of course, be apparent to those skilled in the art that other compression set additives may be employed as, for instance, those described above as well as, e. g., metallic dialkyl dithiocarbamates described in Pfeifer et al. application Serial No. 354,391, filed May 11, 1953, and assigned to the assignee of the present invention.

The products of this invention are useful in applications such as, for instance, gaskets, tubing, electrical insulation (e. g., as conductor insulation, etc.), shock absorbers, etc. They are particularly suitable for use as gaskets in applications involving high temperature compression conditions especially those conditions where they may be subjected to the effect of halogenated hydrocarbons as insulating media, namely, in the manufacture of capacitors. Because of their resistance to heat, they have value as materials for use in applications where natural or other synthetic rubbers fail owing to the deleterious effects of heat.

What I claim as new and desire to secure by Letters Patent of the United States is:

1. The process for obtaining a convertible hydrocarbon-substituted polysiloxane which in the cured, solid, elastic state has improved compression set characteristics, the said polysiloxane having an average of from 1.98 to 2.01 hydrocarbon groups per silicon atom, which process comprises adding a compression set additive to the said hydrocarbon-substituted polysiloxane from which polysiloxane there has been removed, in the absence of any finely divided inorganic filler, low molecular weight volatile hydrocarbon-substituted polysiloxanes of similar structure present in the aforesaid hydrocarbon-substituted polysiloxane and boiling below 250° C. when measured at 760 mm. to a point where less than 2%, by weight, of the convertible hydrocarbon-substituted polysiloxane comprises the aforesaid low molecular weight hydrocarbon-substituted polysiloxane, the compression set additive being selected from the class consisting of mercury, oxides of mercury, salts of mercury, cadmium salts of organic acids, quinones, naphthoquinones, alkylated quinones, halogenated quinones, alkylated naphthoquinones, halogenated naphthoquinones, and hydrocarbon monoethers of hydroquinone.

2. The process for obtaining a convertible hydrocarbon-substituted polysiloxane having an average of from 1.98 to 2.01 hydrocarbon groups per silicon atom which in the cured, solid, elastic state has improved compression set characteristics, which process comprises removing in the absence of any finely-divided inorganic filler from the aforesaid convertible hydrocarbon-substituted polysiloxane low molecular weight, volatile hydrocarbon-substituted polysiloxanes of similar structure present in the aforesaid convertible hydrocarbon-substituted polysiloxane and boiling below 250° C. when measured at 760 mm. to a point where less than 2 percent, by weight, of the convertible hydrocarbon-substituted polysiloxane comprises the aforesaid low molecular weight hydrocarbon-substituted polysiloxanes, and incorporating in the said devolatilized convertible organopolysiloxane a finely divided inorganic filler, a compression set additive for the convertible hydrocarbon-substituted polysiloxane, and a peroxy curing agent for the latter, the compression set additive being selected from the class consisting of mercury, oxides of mercury, salts of mercury, cadmium salts of organic acids, quinones, naphthoquinones, alkylated quinones, halogenated quinones, alkylated naphthoquinones, halogenated naphthoquinones, and hydrocarbon monoethers of hydroquinone.

3. The process for obtaining a cured, solid, elastic methylpolysiloxane having improved compression set characteristics, which process comprises removing in the absence of any finely-divided inorganic filler from a convertible methylpolysiloxane containing an average of from 1.98 to 2.01 methyl groups per silicon atom of low molecular weight, volatile, cyclic polydimethylsiloxanes present in the aforesaid convertible methylpolysiloxane boiling below 250° C. when measured at 760 mm. to a point where less than 2 percent, by weight, of the convertible methylpolysiloxane comprises the aforesaid volatile polydimethylsiloxanes, incorporating in the said devolatilized convertible methylpolysiloxane from about 1 to 7 percent, by weight, of mercurous oxide and from 0.1 to 8 percent, by weight, benzoyl peroxide, and a finely divided silica filler, and thereafter heating the mixture of ingredients at an elevated temperature for a time sufficient to effect curing of the latter to the cured state.

4. The process for obtaining a cured, solid, elastic methylpolysiloxane having improved compression set characteristics, which process comprises removing in the absence of any finely divided inorganic filler from a convertible methylpolysiloxane containing an average of from 1.98 to 2.01 methyl groups per silicon atom low molecular weight cyclic polydimethylsiloxanes present in the aforesaid convertible methylpolysiloxane boiling below 250° C. when measured at 760 mm. to a point where less than 2 percent, by weight, of the convertible methylpolysiloxane comprises the aforesaid volatile polydimethylsiloxanes, incorporating in the said devolatilized convertible methylpolysiloxane from about 1 to 7 percent, by weight, of 2,5-ditertiary butyl quinone and from 0.5 to 8 percent, by weight, benzoyl peroxide, and a finely divided silica filler, and thereafter heating the mixture of ingredients at an elevated temperature for a time sufficient to effect curing of the latter to the cured, solid, elastic state.

References Cited in the file of this patent

UNITED STATES PATENTS

| | | |
|---|---|---|
| 2,405,041 | Mathes | July 30, 1946 |
| 2,448,530 | Jones | Sept. 7, 1948 |
| 2,460,795 | Warrick | Feb. 1, 1949 |
| 2,709,161 | Kilbourne et al. | May 24, 1955 |

OTHER REFERENCES

Rachow: "Introduction to the Chemistry of the Silicones," 2nd edition, page 95, Wiley (1951).